United States Patent
Green

(10) Patent No.: US 7,216,851 B1
(45) Date of Patent: May 15, 2007

(54) METHOD AND APPARATUS FOR TRAILER JACK MOUNT

(76) Inventor: Paul Green, Route 9, Box 4531, Lake City, FL (US) 32034

( * ) Notice: Subject to any disclaimer, the term of this patent is extended or adjusted under 35 U.S.C. 154(b) by 440 days.

(21) Appl. No.: 09/759,423

(22) Filed: Jan. 12, 2001

(51) Int. Cl.
*B60S 9/02* (2006.01)
(52) U.S. Cl. .................................................. 254/420
(58) Field of Classification Search ........... 254/418, 254/420, 423, 45, 424, 425, 134
See application file for complete search history.

(56) References Cited

U.S. PATENT DOCUMENTS

| | | |
|---|---|---|
| D143,168 S | 12/1945 | Rockwell |
| 2,865,658 A | 12/1958 | Dubuque |
| 3,345,037 A | 10/1967 | Sweetland |
| 3,580,543 A | 5/1971 | Hafeli |
| 3,713,259 A | 1/1973 | Tkach |
| 3,957,249 A | 5/1976 | Williams |
| 4,136,891 A | 1/1979 | Menzel |
| 4,176,824 A * | 12/1979 | Linton et al. ............... 254/423 |
| 4,623,125 A * | 11/1986 | Ebey ........................... 254/418 |
| 4,702,458 A | 10/1987 | Kendrick |
| 4,978,104 A | 12/1990 | Gipson |
| 4,993,677 A | 2/1991 | Patterson |
| 5,067,692 A | 11/1991 | Nudd et al. |
| D324,286 S | 2/1992 | Nudd |
| 5,197,311 A | 3/1993 | Clark |
| D344,389 S | 2/1994 | McDonald et al. |
| 5,421,555 A | 6/1995 | Sims |
| D376,336 S | 12/1996 | Unruh |

* cited by examiner

*Primary Examiner*—Robert C. Watson
(74) *Attorney, Agent, or Firm*—Saliwanchik, Lloyd & Saliwanchik

(57) ABSTRACT

The subject invention pertains to a method and apparatus for providing a trailer jack mount. The subject invention also pertains to a method and apparatus for providing a trailer jack mount for use with towable trailers. The subject invention is advantageous for use with trailers, such as utility trailers, which are frequently moved between various locations. The subject apparatus can also enable the mounting of a trailer jack to a trailer such that the trailer jack can quickly transition up or down relative to the trailer. In a specific embodiment, the subject invention includes a first piece mountable to a trailer and a second piece to which a trailer jack can be secured. In this embodiment, the subject apparatus also includes means for securely attaching the second piece to the first piece and allowing the second piece to pivot relative to the first piece. Advantageously, the subject invention can either be retrofitted to an existing trailer with jack, or installed at original manufacture. In another specific embodiment, the second piece is slidably attached to the first piece to allow an individual to adjust the height of the trailer jack.

18 Claims, 2 Drawing Sheets

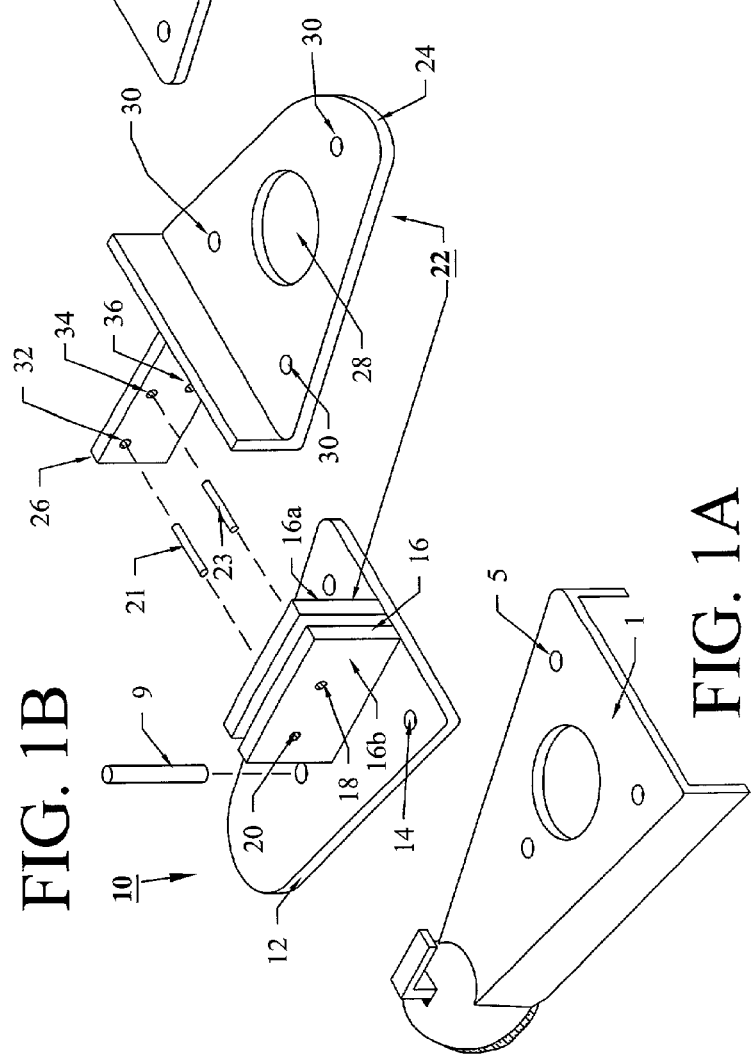

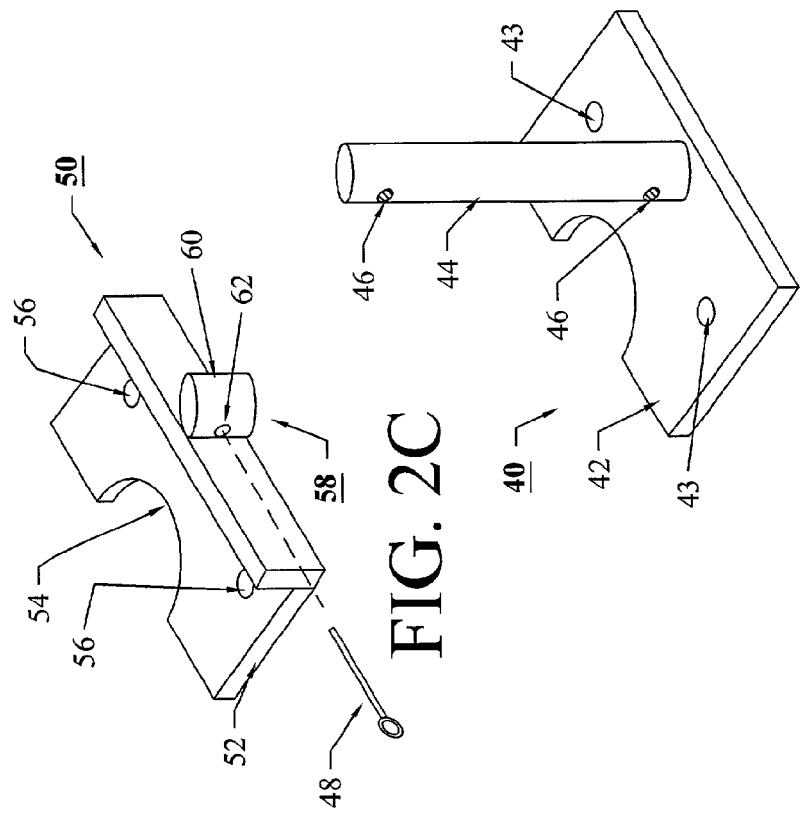
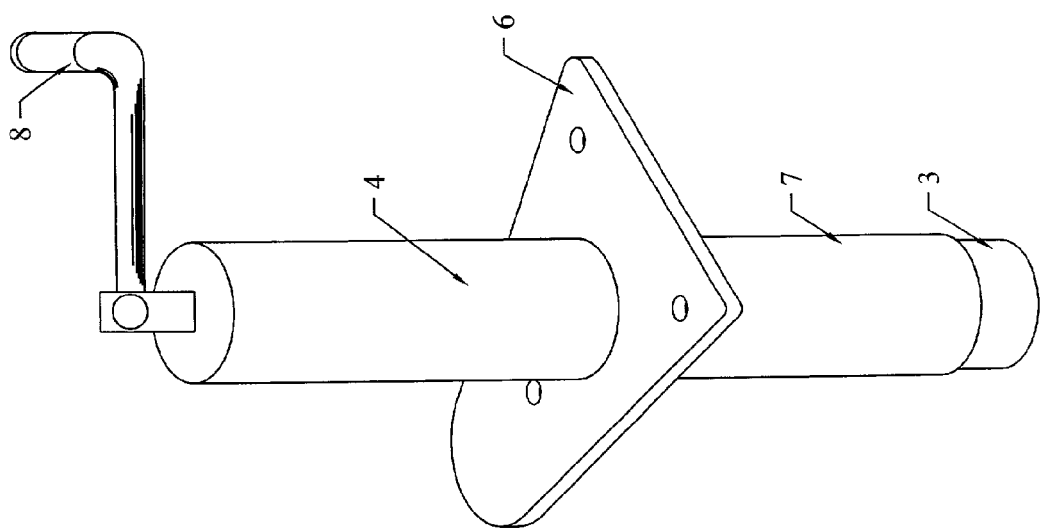

METHOD AND APPARATUS FOR TRAILER JACK MOUNT

BACKGROUND OF THE INVENTION

Towed trailers, such as utility trailers or camper trailers, are in wide spread use in this country and worldwide. Individuals who use these types of trailers often move them from location to location on a frequent basis. Towed trailers typically have wheels and a hitch mechanism to allow them to be attached to a towing vehicle and moved easily. The hitch mechanism normally will employ a tongue coupler to engage a vehicle's hitch and a stabilizer, or trailer jack, which allows the trailer to be supported while disengaged from the towing vehicle.

Towed trailers are typically purchased with a trailer jack installed at the point of manufacture. The trailer jacks typically have a flange, or a mounting bracket integrated with the jack which allows the jack to be mounted to the trailer. The height of the trailer jack is normally adjustable by means of a hand crank. The adjustable trailer jack allows an individual to adapt the jack to differing terrain and use conditions. For example, in typical operation, an individual with a utility trailer will tow the trailer to the desired site. In order to release the towing vehicle, the individual will then crank the trailer jack until the jack meets the ground and raises the trailer's tongue coupler free from the towing vehicle's hitch. The individual is then free to drive the towing vehicle away and the trailer is supported by the trailer jack. In order to tow the trailer again, the process is reversed, requiring the individual to crank the jack such as to lower the trailer's tongue coupler onto the vehicle's hitch and continue cranking the jack until the lowest portion of the jack is high enough off the ground to prevent the jack from hitting the ground during transport.

Thus, as can be see by the typical mode of operation of trailer jacks, a significant amount of time and energy can be expended by the individual in cranking the jack from the up, or travel, position to the down, or supporting, position and vice versa. Additionally, it is important that when the jack is in the up position the jack is sufficiently high enough off the ground, to avoid damage during travel.

Accordingly, there is a need for a trailer jack apparatus and method which allows an individual to quickly and easily transition a jack from the up position to the down position and vice versa. Also, as there are many existing trailers in use which currently have jacks, there is a need for an apparatus and method which can allow existing jacks to be retrofitted with an apparatus allowing the jacks to quickly be transitioned from the up position to the down position and vice versa.

The subject invention relates to a method and apparatus for a trailer jack mount. The subject invention also pertains to a method and apparatus for providing a trailer jack mount for use with towable trailers. The subject apparatus can also enable the mounting of a trailer to a trailer such that the trailer jack can quickly transition up or down relative to the trailer. In a specific embodiment, the subject invention includes a first piece mountable to an A-frame coupler and a second piece to which a trailer jack can be secured. In this embodiment, the subject apparatus also includes means for securely attaching the second piece to the first piece and allowing the second piece to pivot relative to the first piece. Advantageously, the subject invention can either be retrofitted to an existing trailer with jack, or installed at original manufacture. In another specific embodiment, the second piece is slidably attached to the first piece to allow an individual to adjust the height of the trailer jack.

The subject method and apparatus can be used to shorten the time required to transition a trailer jack from an up, or travel position, to a down, or support position, and vice versa. With respect to typical crank jacks, an individual must manually crank the trailer jack the entire distance between the up and down or down and up positions. The subject invention can significantly reduce the amount of cranking needed to transition the jack between the up and down positions and vice versa. The subject invention is advantageous in situations where an individual needs to frequently move a towable trailer, such as a utility trailer used to tow equipment to and from different job sites, because the time needed to mount and dismount the trailer is significantly shortened over currently available solutions.

BRIEF DESCRIPTION OF THE DRAWINGS

FIG. 1A shows the A-frame coupler of a typical trailer.

FIG. 1B shows the bottom portion of an embodiment of the pivot-type trailer jack mount in accordance with the present invention.

FIG. 1C shows the top portion of an embodiment of the pivot-type trailer jack mount in accordance with the present invention.

FIG. 1D shows a typical trailer jack for use with the present invention.

FIG. 2A shows a typical trailer jack for use with the present invention.

FIG. 2B shows the bottom portion of an embodiment of the slide-type trailer jack mount in accordance with the present invention.

FIG. 2C shows the top portion of an embodiment of the slide-type trailer jack mount in accordance with the present invention.

DETAILED DISCLOSURE OF THE INVENTION

The subject invention relates to method and apparatus for a trailer jack mount. The subject invention also pertains to a method and apparatus for providing a trailer jack mount. The subject invention can enable the mounting of a trailer jack such that the jack can be easily and rapidly transitioned between an up, or travel, position and a down, or support position. The subject invention is advantageous in situations where an individual desires to move a trailer frequently, as the subject invention permits the trailer to be readied for transport in a shorter period of time than can be realized with typical trailer crank jacks. In a specific embodiment, the subject invention can be retrofitted to a trailer with an existing jack, such that the jack is then pivotally attached to the A-frame coupler. Alternatively, the subject invention can be integrated into a new trailer prior to a retail sale in order to utilize the advantage herein disclosed.

FIGS. 1B and 1C illustrate an embodiment of a movable trailer jack mount in accordance with the subject invention. The trailer jack mount can be constructed with any number of parts, but preferably is made from two portions, a bottom portion 10, as shown in FIG. 1B and a top portion 22 as shown in FIG. 1C. The bottom portion 10 can have a trailer mounting structure 12 and transitioning structure 16. Transitioning structure 16 can be a separate piece attached to the mounting structure by, for example, fasteners or by weld, or can be integral with the mounting structure. In trailers commonly referred to as utility trailers, the trailer typically has an A-frame coupler 1 which contains an opening designed to accept a standard trailer jack 4. FIG. 1A shows a typical A-frame coupler 1 and FIG. 1D shows a typical trailer jack 4. The jack 4 typically has a flange 6 which allows the jack to be mounted to the A-frame coupler 1. When the jack 4 is mounted to the A-frame coupler 1 in this way the jack handle 8 can then be turned in order to raise or lower the trailer tongue with respect to the ground due to the foot 3 of the jack raising or lowering relative to the body of the jack. The foot 3 of the jack can have, for example, a wheel to contact the ground and allow the trailer to be rolled.

In a preferred embodiment, after the jack is removed from the A-frame coupler, the bottom portion 10 of the subject mount can be secured to the A-frame coupler 1. Preferably, the bottom portion 10 is removably secured to the trailer through attachment structure 9 such as screws, bolts, or pins. In order to aid in securing the bottom portion 10, the trailer mounting structure 12 can have several holes 14 matched to the holes 5 located in the A-frame coupler 1. Alternatively, the bottom portion 10 can be attached permanently to the A-frame coupler through welding or other adequate means of permanently affixing the bottom portion 10 to the A-frame coupler.

The transitioning structure 16 of the bottom portion 10 preferably extends perpendicular to the trailer mounting structure 12, although other degrees of declination will not affect functionality of the subject invention. In a preferred embodiment, the transitioning structure 16 provides means for the top portion 22 to be pivotally connected such that the top portion 22 can be pivotally transitioned between a plurality of positions with respect to the bottom portion 10. In this embodiment, the transitioning structure 16 can comprise one or more extending portions, such as extending portions 16a and 16b as shown in FIG. 1B. The extending portions 16a and 16b provide a region in between where the top portion 22 can be attached. Alternatively, the transitioning structure 16 can have a larger number of extending portions without affecting the functionality of the invention.

In the specific embodiment of the subject invention shown in FIGS. 1B and 1C, the top portion 22 can have a jack mounting structure 24 and a pivoting arm 26. In a preferred embodiment, the jack mounting structure 24 can have a mounting aperture 28 sized to accept a desired trailer jack 24. Alternatively, jack mounting structure 24 can be cut away in a similar fashion to jack mounting piece 50 shown in FIG. 2C. Such a cut away may allow easier mounting of the jack. The jack mounting portion 24 can also contain mounting holes 30 to secure the trailer jack 4 to the top portion 22, such as holes matched to the trailer jack mounting plate 6 which is normally built into to the typical trailer jack used in the art. The mounting holes 30 can be used to removably secure the trailer jack 4 to the top portion 22 through the use of screws, bolts or other means suitable for the purpose. Alternatively, the trailer jack 4 can be permanently attached to the top portion 22 by, for example, welding.

The extending portions 16a and 16b can further have a pivot aperture 20. An aperture 20 can be used to house a pivot axle 21, allowing the top portion 22 to freely pivot. Thus, the bottom portion 10 serves to secure the subject invention to a trailer as well as providing structures to allow the top potion 22 to pivot relative to the bottom portion 10. To aid in securing the top portion 22 in one of at least two portions relative to the bottom portion 10, the extending portions 16a and 16b can have a lock aperture 18. This aperture can receive a retention structure 23 to secure the top portion 22 when the top portion 22 has been pivoted between different positions of use.

The pivoting arm 26 of the top portion 22 preferably contains at least one axle aperture 32 and at least two lock apertures 34 and 36. It is understood that any number of combinations of axle apertures and lock apertures can be used without affecting the functionality of the subject invention. The pivot arm 26 can interfit with the extending portions 16 of the bottom portion 10 to allow a pivoting axle 21, such as a pin or bolt to be passed through the axle aperture 32 of the top portion 22 and the pivot aperture 20 of the extending portions 16a and 16b. Alternatively, the top portion 22 can contain any number of pivot arms 26 corresponding to the plurality of arrangements of extending portions 16a and 16b available for the bottom portion 10. The pivot arm 26 can further contain a retention structure 23 such as a bolt or pin. The retention structure 23 can be passed through, for example lock aperture 34 of the top portion 22 and lock aperture 18 of the transitioning structure 16 in order to lock the top portion 22 into place. In a specific embodiment, retention structure 23 is movably attached to transitioning structure 16 such that retention structure 23 can be pulled out to release pivoting arm 26 and pushed in to engage pivoting arm 26, and when let go will remain attached to transitioning structure 16. Retention structure 23 can be spring loaded such that when let go it automatically pushes toward pivoting arm 26. Other mechanisms can also be used to adjustably secure top portion 22 in position relative to bottom portion 10 as well, such as a rachet mechanism or a push-button release mechanism. Thus, the top portion 22 provides structures which allow a trailer jack 4 to be mounted to the top portion 22 as well as structures which allow the top portion 22 to be pivotally mounted to the bottom portion 10.

A preferred method of providing a pivotable trailer jack mount is now discussed. The subject invention can be installed onto a trailer either prior to retail sale or by a user to retrofit a trailer with an existing jack attached. In this example, the subject invention is described as being retrofitted onto a trailer with an existing jack attached. It is understood that this is an illustration, not intended to be limiting in the application of the subject invention. For example, a similar process could be employed by a trailer manufacturer or distributer in order to integrate the subject invention into a trailer prior to retail sale.

An individual wishing to utilize the subject trailer jack mount can remove the trailer jack 4 from the A-frame coupler 1. The individual can then place the trailer jack into the mounting aperture 28, or other means, of the top portion 22. The trailer jack 4 can then be secured, permanently or removably to the top portion 22 using, for example, screws inserted through the trailer jack mounting plate 6 and the mounting holes 30 of the top portion 22. The individual can then install the bottom portion 10 of the trailer jack mount onto the A-frame coupler 1 either permanently or removably. Once the bottom portion 10 is mounted, the individual can install the top portion 22 and trailer jack 4 portion by placing the pivoting arm 26 of the top portion 22 in between the extending portions 16a and 16b of the bottom portion 10. A pivot axle 21 can then be inserted through the pivot apertures 20 of the bottom portion and the axle aperture 32 of the top portion 22.

The jack 4 shown in FIGS. 1D and 2A have a handle 8 which can be cranked to raise and lower the foot 3 of the jack with respect to the lower portion 7 of the jack 4. The top portion can be transitioned between any number of positions relative to the bottom portion 10. Accordingly, the subject invention can allow the lower portion 7 of the jack, and therefore foot 3 of the jack 4, to be raised or lowered with respect to the ground by moving the top portion 22 with respect to the bottom portion 10, in addition to being raised or lowered by the cranking of handle 8. Furthermore, raising or lowering the foot of the jack via the subject jack mount can be much quicker than cranking the handle.

In the embodiment shown in FIGS. 1B and 1C, the subject jack mount has two settings, an up, or travel, position and a down, or supporting, position. In the up position, the lower portion 7 of the jack 4 can be positioned upward relative to the ground, thus preventing the foot 3 of the jack 4 from striking the ground when the trailer is in motion. In the down position, the foot 3 of the jack 4 can contact the ground, stabilizing and supporting the trailer while separated from the towing vehicle. In order to hold the position of the jack 4, a retention structure 23, such as a bolt or pin can be employed. In the up position, for example, the retention structure 23 can be inserted through the lock apertures 18 of the extending portions 16a and 16b and the lock aperture 36 of the pivot arm 26 which corresponds to the up position. Similarly, in the down position, a retention structure 23 can be inserted through the lock apertures 18 of the extending portions 16a and 16b and also through the lock aperture 34 corresponding to the down position.

FIGS. 2B and 2C illustrate an alternative embodiment of a trailer jack mount in accordance with the subject invention. With respect to this embodiment, FIG. 2B shows a trailer mounting portion 40 mountable to a trailer. The mounting portion 40 can have a mounting structure 42 and a mounting post 44. The mounting structure 42 can be mounted to a trailer permanently or, alternatively, removably mounted using means such as bolts, pins or rivets passed through mounting apertures 43. The mounting post 44 is preferably permanently attached to the mounting structure 42, but alternatively can be detachably mounted using any means common in the art. The mounting post 44 as shown in FIG. 2B has a circular cross-section. Other cross-sectional shapes can also be incorporated. For example, a square cross-sectional shape can be used to keep the mounting collar 60 from rotating with respect to the mounting post 44. The mounting post 44 preferably extends substantially perpendicular to the mounting structure 42, although non-perpendicular orientation does not detract from the functionality of the subject invention. The mounting post 44 can have several post lock apertures 46 located along the length of the mounting post 44.

The post lock apertures 46 can be used to communicate with a locking device 48. The locking device 48 can be made from any material suitable to withstand the load involved in supporting a trailer jack, such as steel, composite, or wood. The locking device 48 can be constructed from any type of structure, such as a pin, bolt, screw or wood peg. Preferably, the locking device 48 is a metal pin. In an alternative embodiment, the locking device 48 can be a spring-loaded pin. The locking device 48 can be of any shape, such as round or square, provided that the chosen shape corresponds with the shape of the post lock apertures 46 to facilitate communication between the two elements.

FIG. 2C illustrates a jack mounting portion 50 to which a jack can be mounted in accordance with the subject invention. The jack mounting portion 50 can have a mounting structure 52 and a slide-collar portion 58. The mounting structure 52 can have means for accepting a trailer jack 54, such as indentations, grooves, or apertures. In the present embodiment, the mounting structure 52 has an indentation sized to accept a trailer jack 4. The mounting structure 52 can also contain jack attachment structures 56 to secure a trailer jack 4 to the mounting structure 52.

The slide-collar portion 58 of the illustrated embodiment can contain a mounting collar 60 and any number of mounting apertures 62. The mounting collar 60 can be used to slidably attach the jack mounting portion 50 to the trailer mounting portion 40 by interfitting over the mounting post 44. The embodiment shown in FIGS. 2B and 2C utilizes one mounting post 44 and one mounting collar 60, but it is understood that any combination of mounting posts 44 and mounting collars 60 can be used without affecting the functionality of the invention. For example, there could be two mounting collars 60 attached to an elongated slide-collar portion 58 in order to further lessen the side-to-side movement of the trailer jack 4 when installed. Alternatively, there could be two or more mounting posts 44 along with any number of mounting collars 60. Further, it is contemplated to switch the position of the mounting post 44 and the mounting collar 60. In this fashion, the mounting post 44 can be attached to the mounting structure 52 of jack mounting portion 50 to which the trailer jack 4 is attached and the mounting collar 60 can be attached to the mounting structure 42 of trailer mounting portion 40 which is attached to the the A-frame coupler. In the specific illustrated example, the mounting collar 60 is of a circular design. It is also contemplated to produce mounting collars 60 and corresponding mounting posts 44 of different cross-sectional shapes, such as square or triangular.

The collar mounting apertures 62 can be used to slidably secure the jack mounting portion 50 to the mounting post 44 through the use of a locking device 48. For example, the mounting collar 60 can have any number of collar mounting apertures 62 which, when the mounting collar 60 is slidably mounted onto the mounting post 44, will align with a desired post mounting aperture 46 located on the mounting post 44. Once aligned, a locking device 48, such as a pin can be inserted through the post mounting apertures 46 and the ring mounting apertures 62 to lock the jack mounting portion 50 into a desired position. In the illustrated example, the locking device 48 is a removable pin which is fully detachable from the apparatus. It is, however, contemplated to use other means which are not fully detachable from the subject apparatus, such as a spring loaded device attached to the slide collar portion 58. In using the spring loaded device, a user can pull back on the spring loaded device, thereby pulling the device clear of the post mounting aperture 46, allowing the jack mounting piece 52 to slide along the mounting post 44 to a desired aperture alignment. The spring loaded device can then push into post mounting aperture 46, be released, locking the apparatus in place. The spring loaded device is provided as an example of alternative structures contemplated for use in the subject invention and is not intended to be limiting in any respect.

It should be understood that the example and embodiments described herein are for illustrative purposes only and that various modifications or changes in light thereof will be suggested to persons skilled in the art and are to be included within the spirit and purview of this application and the scope of the appended claims.

The invention claimed is:

1. A trailer jack mounting apparatus, comprising:
    a first piece mountable to an A-frame coupler of a trailer; and
    a second piece mountable to a trailer jack,
    wherein said first piece and said second piece are movably connected to each other such that said second piece can transition between a plurality of positions relative to said first piece, wherein once said first piece is mounted to the A-frame coupler of the trailer and the trailer jack is mounted to said second piece, the trailer jack mounted to said second piece can transition between a corresponding plurality of positions relative to the trailer mounted to said first piece.

2. The apparatus according to claim 1, further comprising:
a means for releasably securing said second piece in at least two of the plurality of positions relative to said first piece.

3. The apparatus according to claim 2, wherein said first piece is pivotally connected to said second piece.

4. The apparatus according to claim 3, wherein said first piece comprises a trailer mounting structure for mounting to the A-frame coupler of the trailer and at least one extending structure for pivotally connecting to said second piece, wherein said second piece comprises a trailer jack mounting structure for mounting to the trailer jack and at least one pivoting arm for pivotally connecting to said first piece, wherein said at least one extending structure and said at least one pivoting arm are pivotally connected to each other by a pivoting means.

5. The apparatus according to claim 4, wherein said pivoting means is a pin, wherein said pin is inserted in a first aperture in said at least one extending structure and in a second aperture in said at least one pivoting arm.

6. The apparatus according to claim 4, wherein said means for releasably securing said second piece in at least two of the plurality of positions relative to said first piece can releasably secure said second piece in an up position relative to said first piece and can releasably secure said second piece in a down position relative to said first piece, wherein the up position positions the trailer jack relative to the trailer so as to allow the trailer to be transported without interference by the trailer jack and the down position positions the trailer jack to allow the trailer jack to support the trailer's tongue with respect to the ground.

7. The apparatus of claim 6, wherein said means for releasably securing said second piece in at least two of the plurality of positions relative to said first piece comprises a locking pin, wherein said locking pin is inserted in a first lock aperture in said at least one extending structure and is inserted in an up position aperture in said at least one pivoting arm to secure said second piece in the up position relative to said first piece, and wherein said locking pin is inserted in said first lock aperture in said at least one extending structure and is inserted in a down position aperture in said at least one pivoting arm to secure said second piece in a down position relative to said first piece.

8. The apparatus according to claim 6, wherein said means for releasably securing said second piece in at least two of the plurality of positions relative to said first piece comprises a locking pin, wherein said locking pin is inserted in a first lock aperture in said at least one pivoting arm and is inserted in an up position aperture in said at least one extending structure to secure said second piece in the up position relative to said first piece, and wherein said locking pine is inserted in said first lock aperture in said at least one pivoting arm and is inserted in a down position aperture in said at least one extending structure to secure said second piece in a down position relative to said first piece.

9. The apparatus according to claim 4, wherein said first piece is removably mounted to the A-frame coupler of the trailer.

10. The apparatus according to claim 9, wherein the trailer jack is removably mounted to said second piece.

11. The apparatus according to claim 4, wherein said first piece is permanently mounted to the A-frame coupler of the trailer.

12. The apparatus according to claim 11, wherein the trailer jack is permanently mounted to said second piece.

13. The mounting apparatus according to claim 1, wherein the first piece is mountable to the A-frame coupler of the trailer, wherein the A-frame coupler is designed to have the trailer jack mounted to the A-frame coupler.

14. The mounting apparatus according to claim 13, wherein the second piece is mountable to the trailer jack, wherein the trailer jack is designed to mount to the A-frame coupler of the trailer.

15. The apparatus, according to claim 1,
wherein the first piece is mountable to an A-frame coupler of a trailer wherein the A-frame coupler has an opening designed to accept the trailer jack.

16. The apparatus, according to claim 1,
wherein the A-frame coupler is located at the front of the trailer and is designed to couple to a hitch ball.

17. An apparatus for mounting a trailer jack to an A-frame coupler that attaches to two frame members of a trailer that meet at the front end of the trailer and incorporates a ball socket for receiving a hitch ball, comprising:
a first piece mountable to an A-frame coupler that attaches to two frame members of a trailer that meet at the front end of the trailer and incorporates a ball socket for receiving a hitch ball; and
a second piece mountable to a trailer jack;
wherein the first piece and the second piece are movably connected to each other such that the second piece can transition between a plurality of positions relative to the first piece, wherein once the first piece is mounted to the A-frame coupler of the trailer jack and the trailer jack is mounted to the second piece, the trailer jack mounted to the second piece can transition between a corresponding plurality of positions relative to the trailer mounted to the first piece.

18. The apparatus according to claim 17, further comprising:
a means for releasably securing the second piece in at least two of the plurality of positions relative to the first piece,
wherein the first piece is pivotally connected to the second piece,
wherein the means for releasably securing the second piece in at least two of the plurality of positions relative to the first piece can releasably secure the second piece in an up position relative to the first piece and can releasably secure the second piece in a down position relative to the first piece, wherein the up position positions the trailer jack relative to the trailer so as to allow the trailer to be transported without interference by the trailer jack and the down position positions the trailer jack to allow the trailer jack to support the trailer's tongue with respect to the ground,
wherein the first piece comprises a trailer mounting structure for mounting to the A-frame coupler of the trailer and at least one extending structure for pivotally connecting to the second piece,
wherein the second piece comprises a trailer jack mounting structure for mounting to the trailer jack and at least one pivoting arm for pivotally connecting to the first piece,
wherein the at least one extending structure and the at least one pivoting arm are pivotally connected to each other by a pivoting means,
wherein the means for releasably securing the second piece in at least two of the plurality of positions relative to the first piece comprises a locking pin, wherein the locking pin is inserted in a first lock aperture in the at least one extending structure and is inserted in an up position aperture in the at least one pivoting arm to secure the second piece in the up position relative to the first piece, and wherein the locking pine is inserted in the first lock aperture in the at least one extending structure and is inserted in a down position aperture in the at least one pivoting arm to secure the second piece in a down position relative to the first piece.

* * * * *

UNITED STATES PATENT AND TRADEMARK OFFICE
CERTIFICATE OF CORRECTION

PATENT NO. : 7,216,851 B1  Page 1 of 1
APPLICATION NO. : 09/759423
DATED : May 15, 2007
INVENTOR(S) : E. Paul Green It is certified that error appears in the above-identified patent and that said Letters Patent is hereby corrected as shown below:

Column 1,
Line 57, "enable the mounting of a trailer to a trailer" should read
-- enable the mounting of a trailer jack to a trailer --.

Column 4,
Lines 28-29, "a rachet mechanism" should read -- a ratchet mechanism --.

Column 6,
Lines 21-22, "to the the A-frame coupler" should read -- to the A-frame coupler --.

Column 7,
Line 55, "wherein said locking pine" should read -- wherein said locking pin --.

Column 9,
Line 5, "wherein the locking pine is inserted" should read
-- wherein the locking pin is inserted --.

Signed and Sealed this

Second Day of September, 2008

JON W. DUDAS
*Director of the United States Patent and Trademark Office*